Feb. 7, 1950     J. J. PHILLIPS     2,496,491

FILING WHEEL

Filed March 8, 1946     2 Sheets-Sheet 1

Inventor:
Joseph J. Phillips.
By Paul O. Pippel
Atty.

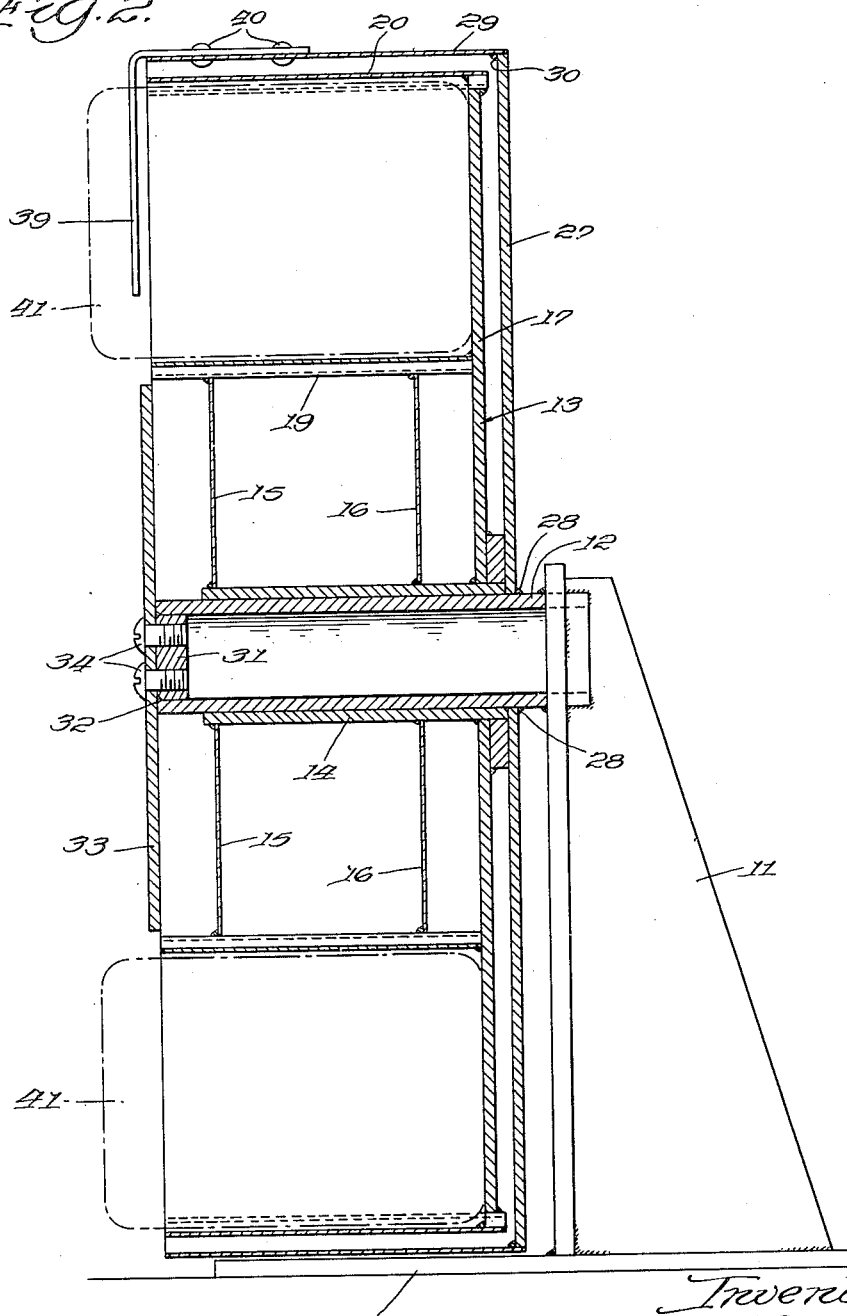

Patented Feb. 7, 1950

2,496,491

UNITED STATES PATENT OFFICE 2,496,491

FILING WHEEL

Joseph J. Phillips, Orland Park, Ill.

Application March 8, 1946, Serial No. 653,022

3 Claims. (Cl. 129—16)

This invention relates to a new and improved filing wheel and is an improvement over my copending application entitled Perpetual status cycle wheel having Serial No. 598,821 and filed June 11, 1945.

An important object of this invention is to provide a device for carrying filing cards or the like and for moving all the cards as a unit when indexing them for designations of certain periods of time.

Another important object of this invention is the provision of an automatic tickler system whereby cards or other filing material may be inserted in the device so as to be called up at any predetermined time.

Still another object of this invention is the incorporation of pockets into a single annular series arranged so that a portion of the pockets can be considered ahead of schedule and the remaining portion may be considered behind schedule.

Other and further objects will become apparent from the disclosures in the following specification and accompanying drawings wherein:

Figure 2 is a sectional view taken on the line 2—2 of Figure 1.

As shown in the drawings:

Figure 1:
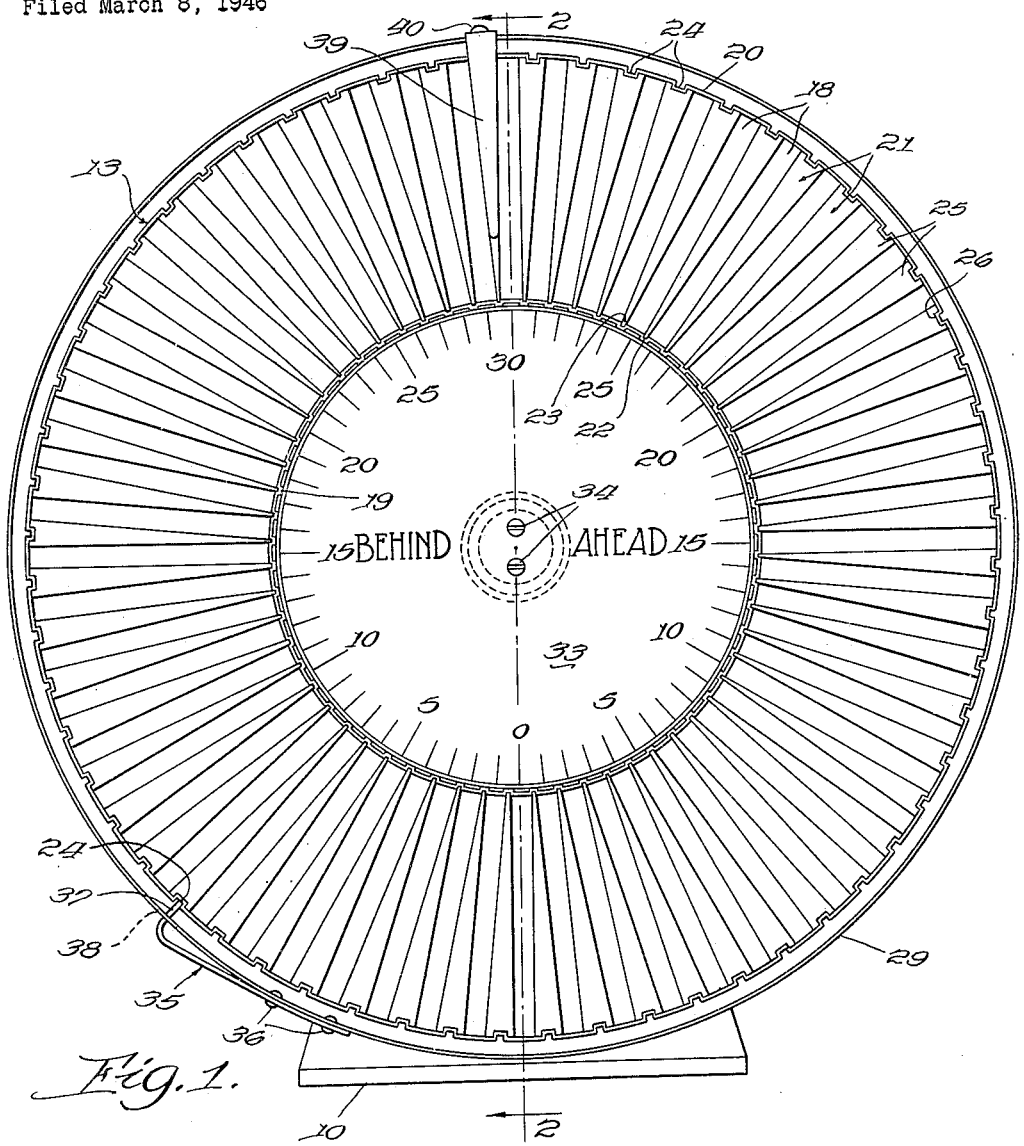
Figure 1 is a front elevational view of the filing wheel of this invention.

The reference numeral 10 indicates generally a base having an upwardly extending rigid structure 11 supporting a spindle 12 on which is journaled a wheel-like device 13.

The rotatable wheel 13 is equipped with an inner sleeve member 14 which is journally rotatable directly on the stationary spindle 12. Extending radially outwardly from the sleeve member 14 are ribs 15 and 16 which in conjunction with a back plate 17 support an annular series of pockets 18. The inner and outer limits of the pockets are defined by an inner annular circular strip of material 19 and an outer annular band member 20. Between these inner and outer bands 19 and 20 are positioned spacers 21 to completely define the individual pockets 18. The circular band 19 is equipped with evenly spaced transverse grooves 22 within which the inner ends 23 of the spacers 21 are positioned. The outer band 20 is equipped with inwardly extending evenly spaced transverse ridges 24. Outer ends 25 of the spacer members 21 have transverse grooves 26 adapted to engage and mate with the inwardly projecting ridges 24 on the band 20. The spacers 21 may therefore be slidably moved in a direction axially of the stationary spindle 12 to either position or to remove the spacers. As shown in Figure 1, the spacers 21 are positioned in each of the grooves and ridges provided in the inner and outer bands 19 and 20. It is possible, however, to remove certain of the spacers 21 should larger and a less number of pockets be desired.

A stationary back wall 27 is provided behind the wheel 13 and forms a radial extension of the stationary spindle 12. This circular back wall 27 is welded at 28 to the spindle 12. An outer periphery band 29 is attached by welding or the like at 30 to the circular back plate 27. This outer band 29 along with the back plate 27 serves to completely enclose the wheel portion 13 of this device except for its front face.

A plug 31 is welded within the outer end of the stationary sleeve spindle 12 at 32. A circular disk 33 is attached to the plug 31 within the stationary spindle 12 by screws 34. This circular plate 33 is stationary and serves to enclose the structural rib members 15 and 16 as well as to provide legend space adjacent the inner ends of the pockets 18.

The pockets are of a size adapted to loosely receive standard filing cards. The filing wheel of this invention may be used in many ways, but for purposes of illustration let us assume that the wheel is to be used to organize and control the purchasing for a product to be manufactured. In the manufacture of a complicated item such as an automobile or the like, the purchasing department of a company orders many raw materials, some that are partly finished and others that are entirely finished. If there are one hundred automobiles to be manufactured, it is necessary for the purchasing department to order enough parts to manufacture these automobiles. It is entirely possible that orders from at least a thousand different sources of supply will be placed. After the orders have been made there is usually no way of checking on whether the materials have been received until at the last minute the shop man rushes into the purchasing department and exclaims that certain materials are not present and the production line is being held up. The function of the wheel of this invention is to coordinate and to make possible a visual control of the status of materials ordered. A card is made for each purchase order and supplied with data indicating the date of the order, the materials ordered, the date on which the material is to be received, and the company from which it was ordered. So that the production line may start and proceed uninterruptedly, the materials must arrive in an even flow. If the material from one particular order is to arrive within twenty days the card is so marked and inserted in the pocket of this filing wheel opposite the numeral 20 on the half of the circular plate 33 which is designated "ahead." This legend "ahead" means that all the pockets on that side of the wheel indicate items ahead of schedule or items not yet scheduled to be received.

At the end of each day or each period of time, the rotatable portion of the wheel must be indexed one pocket so that the card in the pocket opposite the numeral 20 on the days ahead side will on the succeeding day be in pocket 19 on the same side. A flat spring 35 is riveted or otherwise fastened at 36 to the outer stationary band 19. The end of the flat spring 35 has an inwardly turned edge 37 which passes through an opening 38 provided in the outer band 29. The inwardly turned lip 37 of the flat spring is adapted to engage the slots formed by the inwardly extending transverse ridges 24. This spring 35 maintains the rotatable portion of the wheel fixed with respect to the stationary portion of the wheel except when the lip portion 37 is withdrawn from the slots or the grooves in the outer periphery of the rotatable band 20. After the card originally inserted in the pocket opposite the number 20 has arrived to the pocket opposite the number zero the material should have reached the plant. All cards in the zero pocket are examined to determine whether the material on order has been received. If it has not arrived the card is permitted to remain in the wheel, and as the wheel is indexed one pocket each day the card moves to a position opposite numerical legends on the "behind" side of the circular plate 33. The numerals on the ahead section of the legend plate 33 run in a counter-clockwise direction whereas the numerals on the behind section of the legend plate 33 run in a clockwise direction. In other words, even though the wheel is indexed in the same direction at all times the card in the pockets on the ahead side will reduce in number until the card arrives at the pocket opposite the numeral zero and after that time the number of the pocket will increase on the behind section.

A stationary finger 39 is fastened to the outer stationary band 29 by rivets or the like 40 and projects down over the spacer member 21 at the top of the wheel between the behind and ahead sections of the legend plate 33. When the card arrives at the pocket at the twenty-ninth day behind schedule the wheel cannot be rotated without the card first being removed from the wheel. This is shown in greater detail in Figure 2 wherein a card 41 is shown positioned in one of the pockets 18 projecting out beyond the position of the depending fingers 39.

When there are thousands of cards in the wheel a healthy condition of the production situation will be evidenced by the majority of the cards on the ahead side of the wheel and very few cards on the behind side of the wheel. Of course, it is easy to keep a constant check and to make inquiries on the condition of orders on all cards that pass into the behind section of the wheel. There are times when orders will have to run over into the behind schedule for reasons such as strikes, lack of raw materials, or other similar insurmountable difficulties. In such event the cards will travel into the behind section of the wheel, and when they reach the 29th day behind they must, of course, be put into a separate file.

The unit of time required for each wheel to move one pocket need not be a day but may be an hour or a month depending on the use to which the wheel is put. Further, the wheel need not be used to organize production in a shop, but may be used in any place where an automatic tickler system is required. As an example of another use of the wheel, it is suggested that insurance companies who must necessarily send premium due notices to their policy holders could very effectively and to good advantage use the wheel.

Numerous details of construction may be varied throughout a wide range without departing from the principles disclosed herein, and I therefore do not propose limiting the patent granted hereon otherwise than as necessitated by the appended claims.

What is claimed is:

1. A filing device comprising a stationary structure, a rotatable structure journaled for rotation on said stationary structure, said rotatable structure having a single annular series of open-faced file pockets, and a legend plate secured to the stationary structure and positioned centrally of the annular series of pockets, a first portion of said legend plate having numerals running upward in numerical order in a counter-clockwise direction, each of said numerals adjacent one of the series of file pockets, and a second portion of said legend plate having numerals running upward in numerical order in a clockwise direction, each of said last named numerals adjacent one of the series of file pockets, said first portion constituting an "ahead" section and said section portion constituting a "behind" section, and the pocket between said sections having the numeral zero placed adjacent thereto, said sections having a finger positioned therebetween at a point substantially opposite the zero and fixed to the stationary structure and preventing passage of file cards in the pockets from moving from one section to the other except through the pocket designated as zero.

2. A filing device comprising a stand, a stationary structure mounted on said stand and including a spindle, a rotatable structure journaled on said spindle, said rotatable structure including concentric annular bands, the inner of said bands having formed on the outside thereof transverse grooves, and the outer of said bands having formed on the inside thereof transverse ridges and on the outside corresponding grooves, and spacers having transverse mating ridges and grooves adapted to be spaced and held between the concentric bands to define card filing pockets therebetween, and means carried by said stationary structure engaging the grooves in the outside of the outer concentric band for controlling the movement of the rotatable structure with respect to the stationary structure.

3. A filing device comprising a stand, a stationary structure mounted on said stand and including a spindle, a rotatable structure journaled on said spindle, said rotatable structure including concentric annular bands having formed therein transverse grooves and ridges facing inwardly toward each other, spacers having transverse mating ridges and grooves adapted to be spaced and held between the concentric bands to define card filing pockets therebetween, and a spring detent supported on said stationary structure and arranged and constructed to engage the grooves formed in the outer of the concentric bands by the forming of the inwardly facing ridges.

JOSEPH J. PHILLIPS.

REFERENCES CITED

The following references are of record in the file of this patent:

UNITED STATES PATENTS

| Number | Name | Date |
|---|---|---|
| 859,196 | Boye | July 9, 1907 |
| 875,366 | Moore | Dec. 31, 1907 |
| 936,287 | Antilott | Oct. 12, 1909 |
| 1,281,380 | Ise | Oct. 15, 1918 |
| 1,531,358 | Thompson et al. | Mar. 31, 1925 |
| 2,314,705 | Johnson | Mar. 23, 1943 |

Certificate of Correction

Patent No. 2,496,491

February 7, 1950

JOSEPH J. PHILLIPS

It is hereby certified that error appears in the printed specification of the above numbered patent requiring correction as follows:

Column 4, line 20, for the word "section" before "portion" read *second*;

and that the said Letters Patent should be read with this correction therein that the same may conform to the record of the case in the Patent Office.

Signed and sealed this 20th day of June, A. D. 1950.

[SEAL]

THOMAS F. MURPHY,
*Assistant Commissioner of Patents.*